Jan. 8, 1924.
G. C. POWELL
1,480,113
AUTOMOBILE CAMP EQUIPMENT
Filed March 6, 1922     4 Sheets-Sheet 3
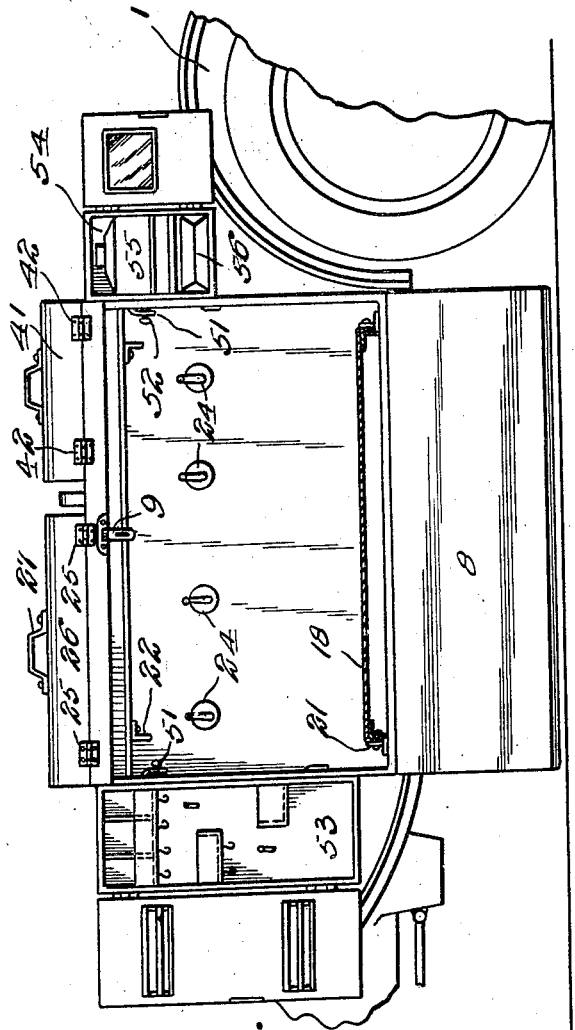
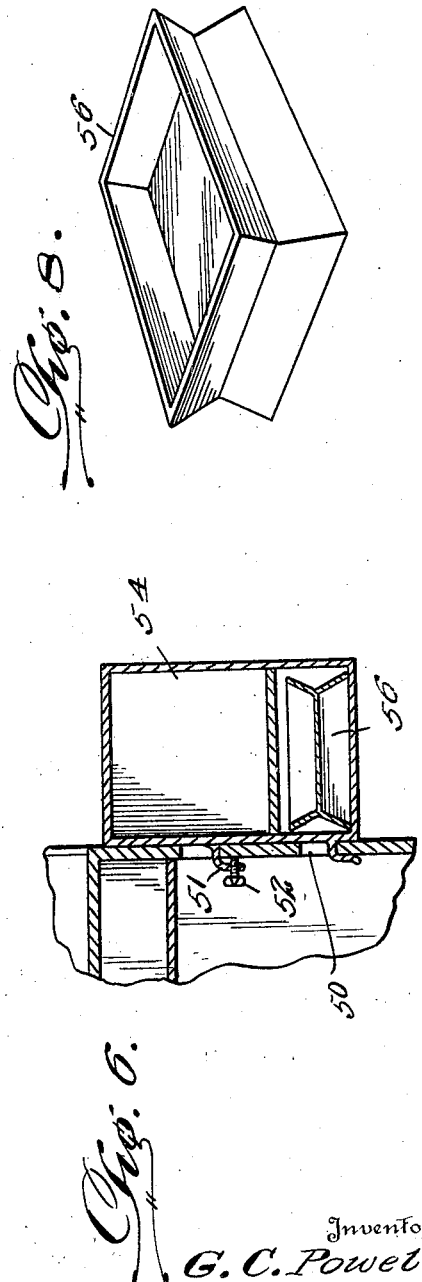

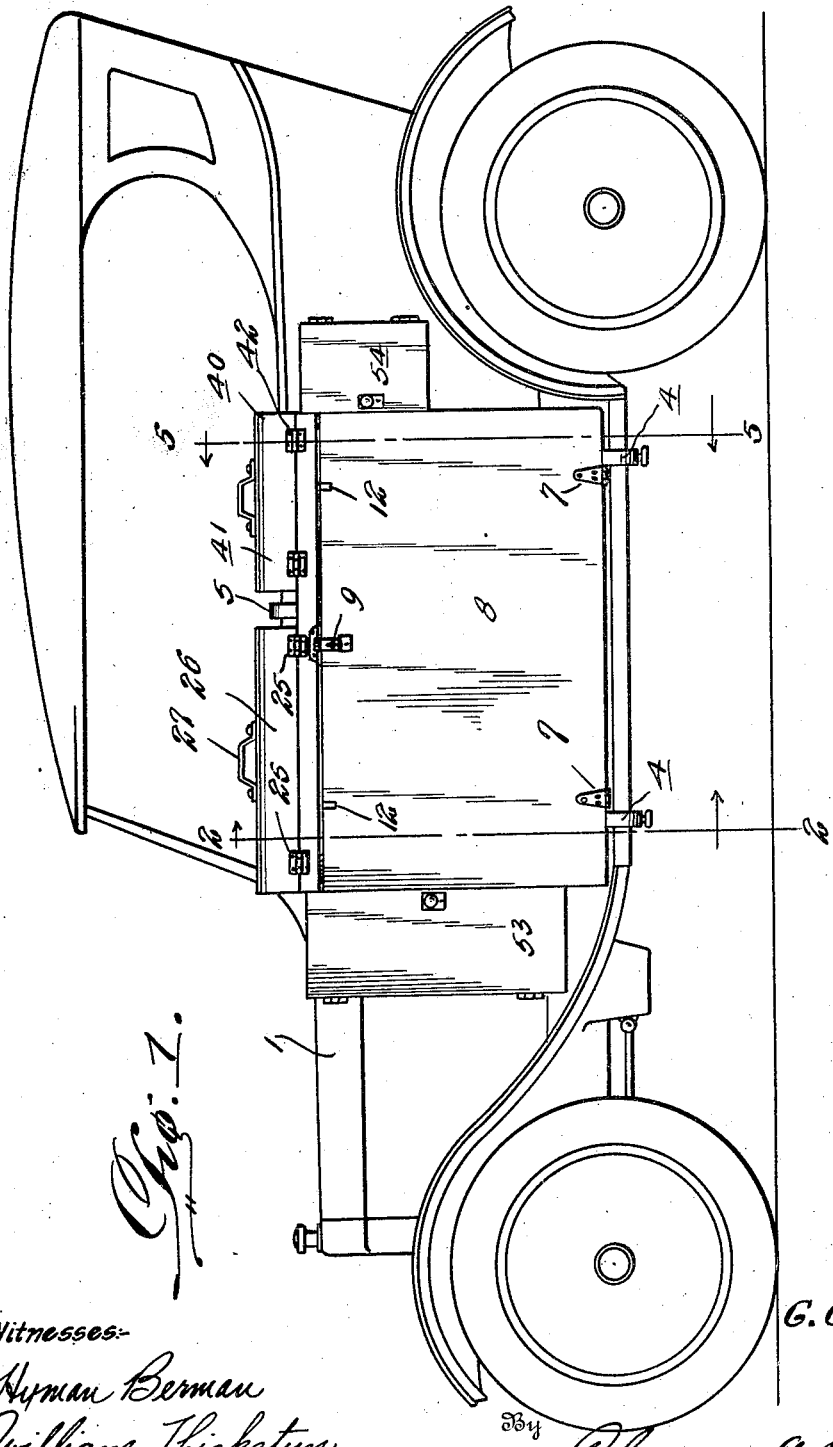

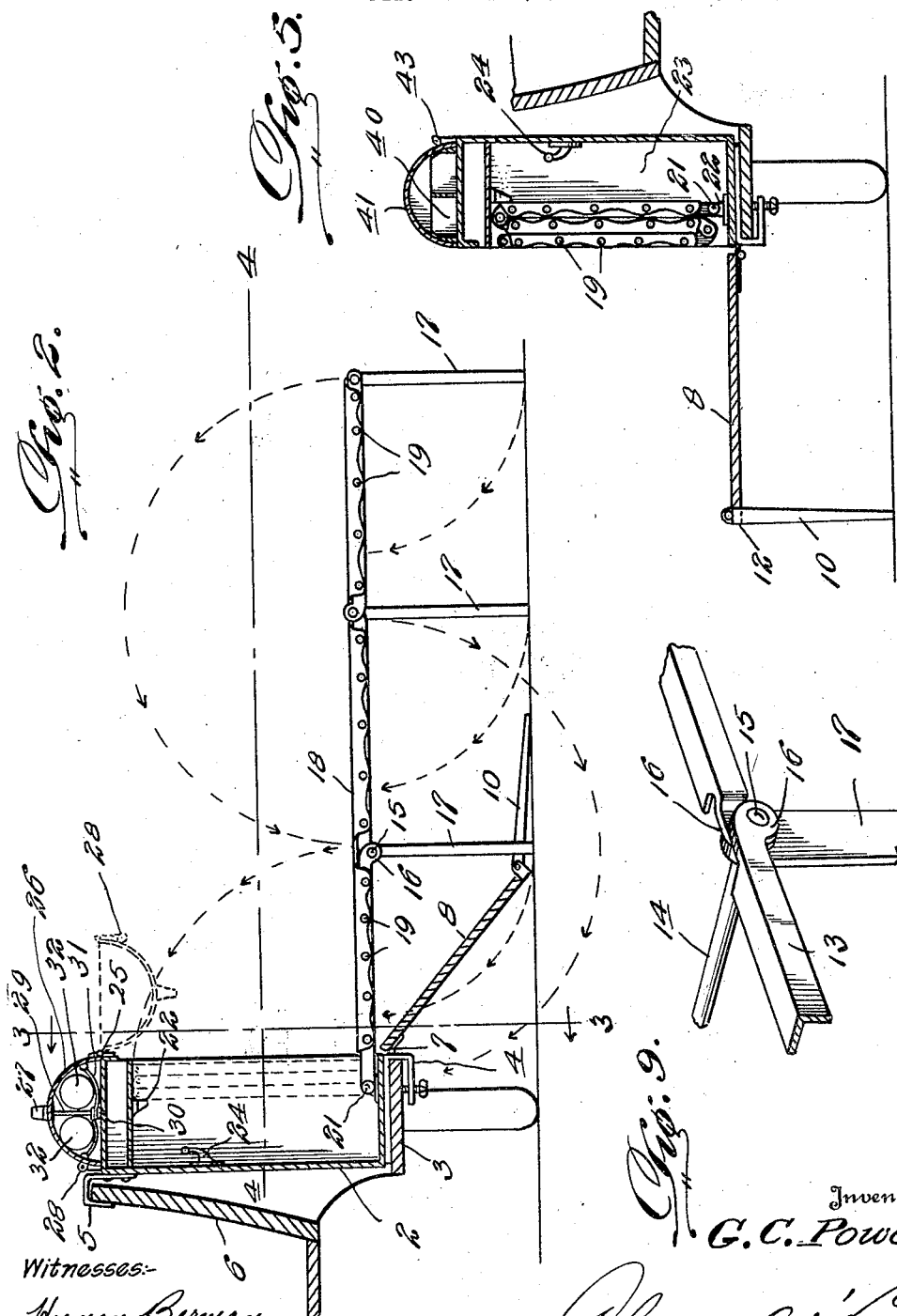

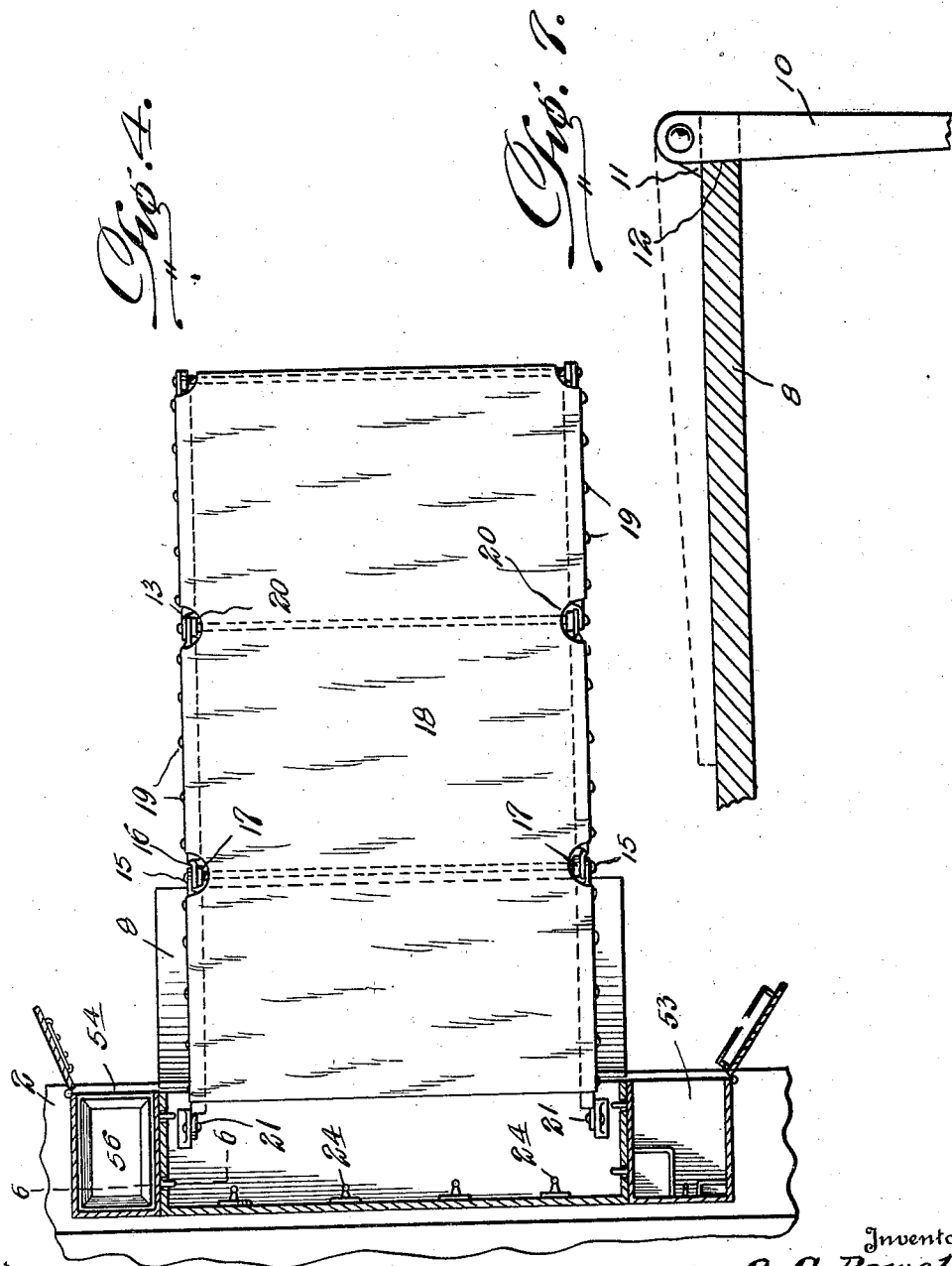

Patented Jan. 8, 1924.

1,480,113

UNITED STATES PATENT OFFICE.

GEORGE C. POWELL, OF BANCROFT, MICHIGAN.

AUTOMOBILE CAMP EQUIPMENT.

Application filed March 6, 1922. Serial No. 541,601.

*To all whom it may concern:*

Be it known that I, GEORGE C. POWELL, a citizen of the United States, residing at Bancroft, in the county of Shiawassee and State of Michigan, have invented new and useful Improvements in Automobile Camp Equipments, of which the following is a specification.

The object of my invention is the provision of a complete automobile camp equipment constructed in such manner and having its parts so relatively arranged that it is adapted to be compactly carried on an automobile without discomfort to the occupant thereof and so that its elements are effectively protected against the weather and yet may be expeditiously and easily positioned for use.

To the attainment of the foregoing, the invention consists in the improvement as hereinafter described and definitely claimed.

In the accompanying drawings, forming part of this specification:—

Figure 1 is a side elevation showing in closed state my novel equipment on an automobile.

Figure 2 is a vertical section taken in the plane indicated by the line 2—2 of Figure 1 and showing the bed of the equipment as arranged for use.

Figure 3 is a vertical section on the line 3—3 of Figure 2.

Figure 4 is a horizontal section on the line 4—4 of Figure 2.

Figure 5 is a vertical section on the line 5—5 of Figure 1.

Figure 6 is a detail vertical section on the line 6—6 of Figure 4.

Figure 7 is a fragmentary view showing the table and one of its legs.

Figure 8 is a perspective showing the duplex, reversible pan comprised in the equipment.

Figure 9 is an enlarged detail perspective showing portions of one leg and side sections of the folding bed.

Similar numerals of reference designate corresponding parts in all of the views of the drawings.

An important characteristic of my invention resides in the fact that it entails no change whatever in the automobile 1 which may be and preferably is of the ordinary well known touring type.

In furtherance of my invention a casing body 2 is superimposed on the automobile running board 3, and is detachably connected to the board 3 by clamps 4 permanently carried by the body 2. On the upper portion of the back of the body 2 is a hook 5, arranged to straddle the adjacent side wall 6 of the automobile body so as to hold the body 2 against outward tilting relative to the automobile body.

Hinged at 7 to the bottom wall of the casing body 2 is the casing door 8, designed to be detachably secured in closed position by the locking means 9 shown in Figure 1 or by any other appropriate fastening means. When unfastened and swung downwardly to a horizontal position the door 8 is adapted to serve as a table, Figure 5, it being supported in horizontal position by its legs 10, Figures 5 and 7, which legs are pivoted between brackets 11 on the door and are adapted when in use to rest in notches 12 of the door. When not in use, the said legs 12 are adapted to rest against the inner side of the door 8 as shown by dotted lines in Figure 7. It will also be understood from Figure 1 that when not in use either as a door or as a table, the element 8 is adapted to idly rest on the ground and under the folding bed or cot of the equipment when it will be out of the way. By reference to Figures 2, 4, 5 and 9 the folding bed will be understood as including angle-iron side sections 13, transverse spacing rods 14 the ends of which serve as pintles 15 to hingedly connect the lapped reduced ends 16 of the side sections, swinging or foldable legs 17 on the said rods 14, and a covering 18 of canvas, duck or other appropriate flexible material lapped over and connected at 19 to the side sections 13, the said covering 18 being notched at 20, Figure 4, in order to avoid interference with the hinge connections alluded to when the bed is folded and unfolded. The innermost side sections 13 of the folding bed are hingedly connected to standards 21 fixed on the upper side of the bottom wall of the casing body 2. From this it follows that the folding bed can be unfolded and adjusted from the position in the casing body 2 and against the fixed stops 22 therein, Figure 5, to the unfolded and extended position shown in Figures 2 and 4, and vice versa; also, that when the bed is in the folded state, the legs 17, which are preferably fixed to the transverse rods 14, will hang between adjacent side sections 13 and thereby contribute to the compactness or small compass of the folded bed. The space 23 in the casing body 2 back of the folded bed, Figure 5, may be used to carry a tent (not shown) as well as folded camp stools (also not shown) the latter being hung on hooks 24, attached to the back wall of the casing body 2. When the bed is folded and disposed in the casing body, the door 8 may be used as a leg-supported table after the manner shown in Figure 5.

Hinged at 25 to the uppper front corner of the casing body 2 is a swinging holder 26 with a handle 27 and an appropriate fastener 28 for detachably securing it in closed position. Carried in and by the holder 26 is a threaded rod 29 on which is removably arranged a threaded nut 30, and also carried in the holder 26 are retainers 31 for thermos bottles 32, the said retainers being hinged at their outer ends to the holder 26 and being apertured near their inner ends to receive the rod 29. Manifestly when the holder 26 is swung to the open position shown by dotted lines in Figure 2, and the nut 30 is removed, the retainers 31 may be swung out of engagement with the rod 29 and the thermos bottles may be lifted out of the holder 26 for use. In the position shown by full lines in Figure 2 the thermos bottles are clamped and securely held and casual movement or rattling thereof is precluded.

Superimposed on the casing body 2 are a plurality of compartments 40, Figure 5, for toilet articles, and over the said compartments is arranged a cover 41, hinged at 42 and designed to be detachably secured in closed position by an appropriate fastener 43.

Each of the end walls of the casing body 2 is apertured as indicated by 50 in Figure 6, and hooked and clamped, as indicated by 51 and 52, respectively, on the said end walls are cabinets designated by 53 and 54, respectively. The cabinet 53 is equipped to carry in safe manner supplies as well as dishes, while the cabinet 54 is designed to carry cooking utensils 55 and 56, the utensil 55 being preferably a boiler while the utensil 56 is a duplex, reversible pan with receptacles such as shown in Figure 8 at its opposite sides, one receptale for use as a dish pan and the other receptale for use as a wash basin.

It will be apparent from the foregoing that notwithstanding the facility with which my improved equipment may be put into and out of use, the equipment is simple, inexpensive and durable in construction and is well adapted to withstand exposure to the weather; also, that because of the capacity of the equipment to be reduced to a small compass, the equipment is not likely to render an automobile unsightly.

Again it will be observed that when it is not desired to use the equipment, the same may, as a unit, be expeditiously and easily detached and removed from the automobile, without scratching or otherwise marring the latter.

I have entered into a detailed description of the constrution and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters Patent, is:—

In an automobile camp equipment, the combination of a casing body, adapted for the reception of a folding bed, a holder hingedly connected to the front top corner of the casing body to swing onto or off of the latter, a threaded rod carried by and arranged centrally in the holder, a nut on said threaded rod, and retainers in and hingedly connected to the holder and apertured to receive said rod and adapted to be secured on the rod by said nut to removably secure thermos bottles or the like in and against the holder and against casual movement.

In testimony whereof, I affix my signature.

GEORGE C. POWELL.